US008671226B2

(12) United States Patent
Hallamaa et al.

(10) Patent No.: US 8,671,226 B2
(45) Date of Patent: Mar. 11, 2014

(54) TRANSACTION CONTROL ARRANGEMENT FOR DEVICE MANAGEMENT SYSTEM

(75) Inventors: Mika Hallamaa, Tampere (FI); Mikko Sahinoja, Tampere (FI); Eero Kaappa, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 13/451,166

(22) Filed: Apr. 19, 2012

(65) Prior Publication Data

US 2012/0203858 A1    Aug. 9, 2012

Related U.S. Application Data

(63) Continuation of application No. 11/011,575, filed on Dec. 14, 2004, now Pat. No. 8,180,927.

(51) Int. Cl.
*G06F 3/00* (2006.01)

(52) U.S. Cl.
USPC .......................................................... 710/5

(58) Field of Classification Search
None
See application file for complete search history.

(56) References Cited

U.S. PATENT DOCUMENTS

| 6,094,600 | A | 7/2000 | Sharpe, Jr. et al. |
| 6,378,069 | B1 | 4/2002 | Sandler et al. |
| 6,687,901 | B1 | 2/2004 | Imamatsu |
| 7,716,276 | B1 * | 5/2010 | Ren et al. .................... 709/203 |
| 2001/0029517 | A1 | 10/2001 | De Meno et al. |
| 2003/0009752 | A1 | 1/2003 | Gupta |
| 2004/0098715 | A1 | 5/2004 | Aghera et al. |
| 2004/0109454 | A1 | 6/2004 | Sahinoja et al. |
| 2004/0148416 | A1 | 7/2004 | Aarnos et al. |

OTHER PUBLICATIONS

"Universal Manager: Seamless Management of Enterprise Mobile and Non-mobile Devices", Sandeep Adwankar, et al., Proceedings of the 2004 IEEE International Conference on Mobile Data Management (MDM'04), pp. 1-12.
Open Mobile Alliance Principle, 2002, Open Mobile Alliance Ltd., pp. 2-3.

* cited by examiner

*Primary Examiner* — Henry Tsai
*Assistant Examiner* — Juanito Borromeo
(74) *Attorney, Agent, or Firm* — Ziegler IP Law Group, LLC

(57) ABSTRACT

A method for arranging transaction control in a device management system. A required transaction control operation is defined in a managing device for arranging transaction control of a management task for a managed device. At least one device management command is defined for the transaction control operation. The at least one device management command is transmitted to the managed device. A required transaction control operation is specified in the managed device onasis of one or more received device management commands, and transaction control for a management task is carried out on the basis of the defined transaction control operation.

4 Claims, 5 Drawing Sheets

TRANSACTION CONTROL ARRANGEMENT FOR DEVICE MANAGEMENT SYSTEM

CROSS-REFERENCE TO RELATED APPLICATIONS

This application is a continuation of U.S. application Ser. No. 11/011,575, filed on Dec. 14, 2004, now allowed, the disclosure of which is incorporated herein by reference in its entirety.

BACKGROUND

The disclosed embodiments relate to arranging transaction control in a device management system.

As different data processing devices, such as mobile stations, become more complex, the significance of device management becomes more pronounced. Devices require several different settings, such as settings related to Internet access points, and setting them manually by the user is arduous and difficult. To solve this problem, for instance, device management solutions have been developed so that the administrator of a company's information system or a teleoperator can set an appropriate configuration for a device. Device management generally refers to actions by which a person typically not using a device can change the configuration of the device; for instance change the settings used by the device. In addition to device-specific settings, it is also possible to transmit user-specific data, such as user profiles, logos, ringing tones, and menus with which the user can personally modify the settings of the device, or the modification takes place automatically in connection with device management.

One of the device management standards is OMA (Open Mobile Alliance) DM (Device management), which is partly based on the SyncML (Synchronization Markup Language) protocol. For instance, a personal computer (PC) can act as a device management server in a device management protocol and a mobile station as a device management client. A device management system may be an operative information system dedicated for service lifecycle management of mobile devices. Service lifecycle management is a concept that refers to management of a software-defined asset in a mobile device, especially one that somehow relates to the mobile services as end-user perceives them. Today an asset to be managed is typically configuration data of some specific service, for instance of a GPRS access point, whereas it is assumed that other required resources, for instance applications or middleware, already reside in the device. As mobile services are becoming richer, value-chains are becoming longer and needs of end-users are becoming more individual, more divergence in terms of software-defined asset will be required, even in identical type of mobile devices. This kind of divergence will increase both in terms of types of asset, for instance settings, executables, libraries, UI elements, certificates, and policies, and footprint of the asset (from a couple bytes of strings revealing the settings to several megabytes containing application-software).

Inherently, management of a service is so technical and complex that it has to be left to the service providers. For management purposes any software defined asset can be seen as a collection of deployment components that are manipulated by the device management system via service management primitives, for instance an install primitive. Typically a management task will require calling several management primitives that aim at changing the asset in the device from one "safe-state" to another. When including time-consuming deliveries of deployment components and manipulation of crucial runtime-entities related to the service, management tasks will introduce a considerable risk for availability of services. At worst case failed management activities may threaten mutual integrity of an asset in the device making it fully inoperative. To minimize downtime of services during management tasks and all related burden to the end-user, management primitives should be controlled by some kind of transaction control mechanism.

Currently the OMA device management introduces a protocol command called "Atomic", by which multiple OMA DM commands (inside the "Atomic") can be executed by the OMA DM client as a set or not at all, see OMA specification "SyncML Representation Protocol, Device Management Usage", version 1.1.2, 13 Jun. 2003, 37 pages. However, the use of this command is very limited, since it requires that all OMA DM commands (for which transaction control may be arranged) are grouped into a single atomic-command. A need also exists to arrange transaction control for management of larger entities, such as manageable items of a service management system.

SUMMARY

A method, data processing devices, and a computer program product are provided, which are characterized by what is stated in the independent claims. Some embodiments of the disclosed embodiments are described in the dependent claims.

According to an aspect of the disclosed embodiments, a required transaction control operation is defined in a managing device for arranging transaction control of a management task for a managed device. At least one device management command is defined for the transaction control operation. The at least one device management command is transmitted to the managed device. A required transaction control operation is specified in the managed device on the basis of one or more received device management commands, and a transaction control specific function is carried out in the managed device on the basis of the defined transaction control operation.

The term "transaction control operation" is to be understood broadly also to refer to any kind of indication of a required transaction control related operation, for instance a transaction control command or a transaction control primitive. The specification of a transaction control operation on the basis of one or more device management commands is to be understood broadly to refer to any kind of mapping, definition and/or identification of a transaction control operation on the basis of one or more device management commands.

The present disclosed embodiments make it possible to enhance transaction control in device management systems. A managing device, for instance an OMA DM server, may carry out transaction control of a management task by the transaction control operations. More versatile transaction control is enabled for device management purposes. It is possible to specify higher layer transaction control operations, in one embodiment specific higher layer transaction control primitives for controlling transaction involving multiple device management commands, which may be delivered or indicated to the managed device by device management commands. Thus a transaction control mechanism better suitable for complex management operations is provided. The further advantage is that it is possible to utilize already existing device management mechanisms, for instance the OMA DM protocol, for delivering the transaction control operations to the managed device.

In one embodiment the managing device receives information indicating statuses of management commands of the controlled management task, and may order a reinstatement or a rollback to an initial state preceding the transaction in case of failure.

BRIEF DESCRIPTION OF THE DRAWINGS

In the following the disclosed embodiments will be described in greater detail by means of exemplary embodiments with reference to the accompanying drawings, in which.

DETAILED DESCRIPTION

Some embodiments of the disclosed embodiments will be described in the following in a system supporting OMA device management; it should, however, be noted that the disclosed embodiments can be applied to any device management system in which device management objects can also be organized in structures other than tree structure.

Figure 1:
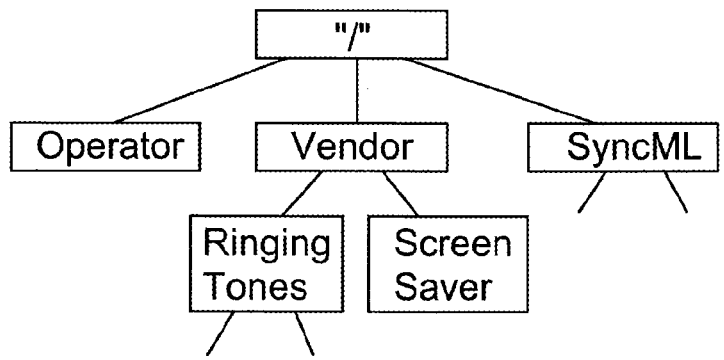
FIG. 1 illustrates a management tree.

Items managed in a device management client device may be arranged as device management objects. The device management objects are entities that can be managed by device management commands to the device management client. A device management object can for instance be a number or a large entity, such as a background image or a screensaver. In OMA device management, the device management objects are arranged in a management tree, which is illustrated in FIG. 1. The management tree is made up of nodes and defines at least one device management object formed of one or more nodes or at least one parameter of a node. A node can be an individual parameter, a sub-tree or a data collection. For instance, a "Vendor" node is an interior node, because it has child objects, "ScreenSaver" and "RingingTones". "ScreenSaver" is a leaf node, because it does not have child objects. "RingingTones" is also an interior node, because it has child objects. The node may comprise at least one parameter that may be a configuration value or a file, such as a background image file in the "ScreenSaver" node. The data contents of a node can also be a link to another node. Each node can be addressed by a uniform resource identifier (URI). The nodes can be fixed or dynamic. The device management client or manager (120) may also add dynamic nodes to the management tree.

Figure 2:
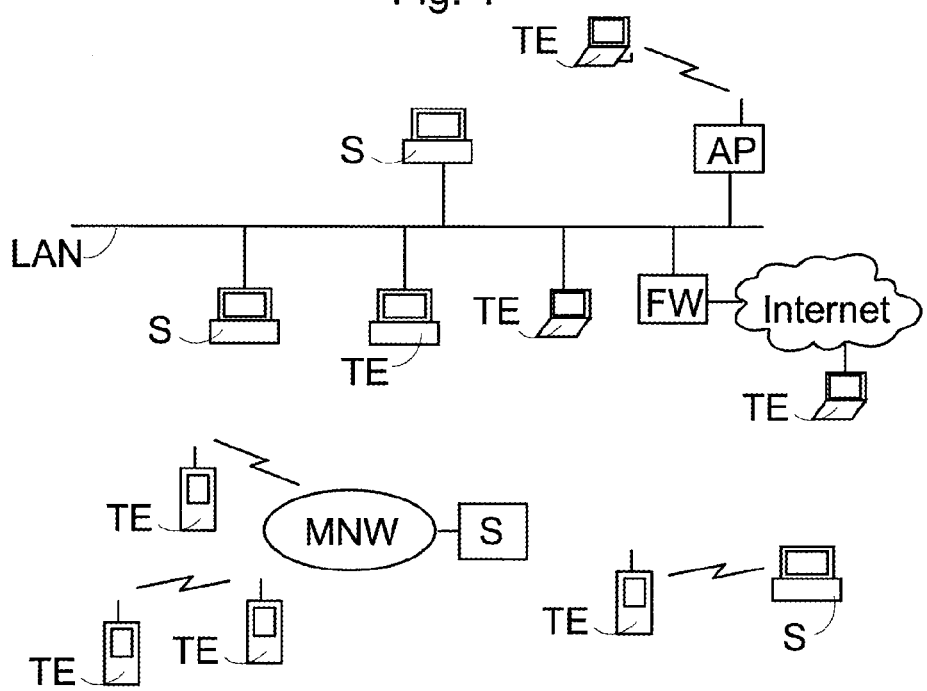
FIG. 2 illustrates some networking scenarios in which the present device management system could be applied.

FIG. 2 illustrates a networked system. A network manager or a PC typically serves as a server S. A mobile station, a PC, a laptop computer, or a PDA (Personal Digital Assistant) device typically serves as a terminal TE. In the following embodiments, it is assumed that for device management, the terminal TE serves as the device management client and the server S as the device management manager. The server S can manage several clients TE.

FIG. 2 shows two examples, in the first of which the clients TE and the management servers S are connected to a local area network LAN. A client TE connected to the network LAN comprises a functionality, such as a network card and software controlling data transmission, for communicating with the devices in the network LAN. The local area network LAN can be any kind of local area network and the TE can also be connected to the server S through the Internet, typically using a firewall FW. The terminal TE can also be connected to the local area network LAN wirelessly through an access point AP.

In the second example, the client TE communicates with the server S through a mobile network MNW. A terminal TE connected to the network MNW comprises a mobile station functionality for communicating wirelessly with the network MNW. There may also be other networks, such as a local area network LAN, between the mobile network MNW and the server S. The mobile network MNW can be any known wireless network, for instance a network supporting GSM services, a network supporting GPRS (General Packet Radio Service) services, a third-generation mobile network, such as a network according to the network specifications of 3GPP (3rd Generation Partnership Project), a wireless local area network WLAN, a private network, or a combination of several networks. The lower-layer transport techniques can be circuit- or packet-switched in accordance with the properties of an underlying mobile network MNW. In addition to the earlier examples, many other device management configurations are also possible, such as a management connection between terminals TE or a direct management connection between the terminal TE and server S by using a wireless or a wired connection without any other network elements.

Figure 3:
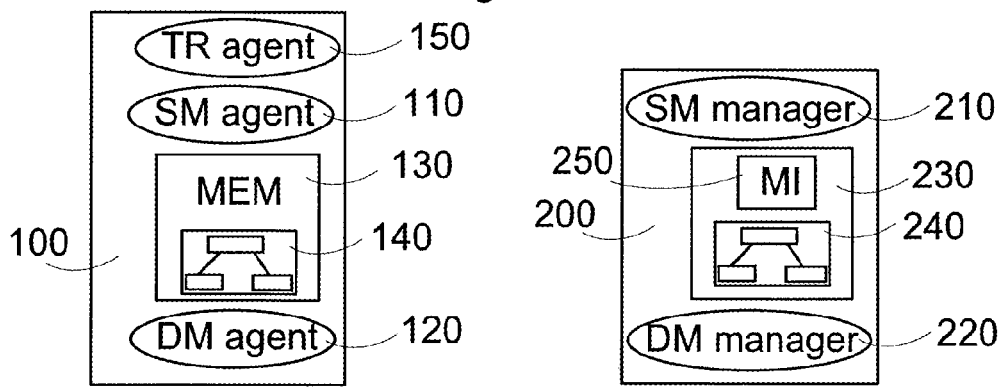
FIG. 3 illustrates data processing devices according to an embodiment of the disclosed embodiments.

In the following an embodiment is illustrated, wherein transaction control is arranged for a service management system utilizing device management. However, it is to be noted that the application of the disclosed embodiments is not limited to the service management system illustrated below but may be well embodied in other device management configurations. As an example of such system is a backup/restore system. FIG. 3 illustrates functional entities of a data processing device 100 functioning as a managed client device in view of service management and a data processing device 200 functioning as a managing device or a server in view of service management. For instance, referring to FIG. 2, the terminal TE could be the client device 100 and the server S could be the server device 200. However, it is to be noted that the application of these functionalities is not limited to any specific devices, and it is even possible that the client and server functionalities are implemented in a single physical device, whereby the terms 'managed device' and 'managing device' may refer to the same physical device.

The exemplary system of FIG. 3 comprises service management (SM) means for managing services in the managed devices, typically for managing applications and/or application components. The data processing device 100 comprises a service management agent 110 (which may also be referred to as a service management client) for monitoring and/or performing service management level operations. The service management level operations may be performed by carrying out service management commands originally defined by a service management manager 210. The service management manager (which may also be referred to as an SM server) 210 defines SM commands and may, in one embodiment, map SM commands to device management (DM) commands on the basis of mapping instructions 250 which may be stored in a memory 230.

In the present embodiment, OMA device management capabilities are used in the service management system. These OMA device management capabilities are specifically used for service management level purposes such that service management level commands are specified (between the managing device 200 and the managed device 100) by device management commands. The data processing device 100 serving as an OMA device management client comprises a DM (client) agent 120 that takes care of functions related to the device management session in the client. The DM (client) agent 120 may execute device management commands from a device management manager 220 (which may also be referred to as a device management server) for management objects in a management tree 140, deliver the management commands to the SM agent 110, and/or perform mapping between received DM commands and SM commands. The data processing device 200 serving as a device management manager comprises a DM manager 220 managing the OMA DM management session which, in one embodiment, may perform mapping of SM commands from SM manager 210 to DM commands. The management tree 140 is stored in a memory 130 of a data processing device 100, and information and/or device description thereof (240) may also be stored in a memory 230 of a data processing device 200. A suitable transport protocol, such as HTTP, may be used for DM level communication.

It is to be noted that the entities of FIG. 3 are only exemplary and a single entity or more than two entities may implement the functions of agents 110 and 120, for instance.

The managed device 100 further comprises a transaction agent 150 arranging transaction control related functions in the managed device 100. This agent 150 may be an independent process in the device 100, or implemented as part of another entity, for instance the SM agent 110. In one embodiment transaction control is arranged for SM level items, for instance deployment components described in more detail below. The managing device 200 may comprise a specific transaction control manager functionality (possibly implemented within another functionality such as the SM manager 210) arranging transaction control related functions in the managing device. It is to be noted that also the transaction control manager may be an independent logical entity and that the transaction control manager and the agent may communicate independently of the service management layer.

Mapping instructions (MI) 250 for arranging mapping between service management commands and device management commands are stored in the data processing device 200. The SM manager 210 may be configured to establish a device management command or primitive on the basis of a service management command and the mapping instructions 250. These mapping instructions may be specifically used for defining one or more appropriate DM commands on the basis of an SM level transaction control primitive.

In an embodiment, mapping instructions for defining service management commands for received device management commands are stored in the memory of the device 100 comprising the SM agent 110 functionality. This embodiment enables received DM commands to be converted into SM commands (for instance by the DM agent 120), which may then be carried out by the SM agent 110. Alternatively, an SM command is defined in the client device 100 on the basis of the execution of one or more DM commands. It is to be noted that the mapping instructions may be directly implemented in the control logic of an entity performing the mapping (for instance the SM manager 210 or the DM manager 220), whereby no separate file for mapping instructions 250 needs to be stored but the mapping instructions may be stored within the program code controlling the processor of the device (200), for instance.

The data processing devices 100, 200 further comprise a transceiver for arranging data transfer, and a processing unit comprising one or more processors. Computer program codes executed in the processing unit may be used for causing the data processing devices 100, 200 to implement means for providing inventive functions relating to arranging transaction control, some embodiments of the inventive functions being illustrated below in association with FIGS. 4a, 4b, 5a, 5b, 5c, and 6. A chip unit or some other kind of hardware module for controlling the data processing device 100 and/or 200 may, in one embodiment, cause the device to perform the inventive functions. The hardware module comprises connecting means for connecting the data processing device 100 and/or 200 mechanically and/or functionally. Thus, the hardware module may form part of the device and could be removable. Some examples of such hardware module are a sub-assembly, a portable data storage medium, an IC card, or an accessory device. Computer program codes can be received via a network and/or be stored in memory means, for instance on a disk, a CD-ROM disk or other external memory means, where from they can be loaded into the memory of the data processing devices 100, 200. The computer program can also be loaded through a network by using a TCP/IP protocol stack, for instance. Hardware solutions or a combination of hardware and software solutions may also be used to implement the inventive functions.

Figure 4A:
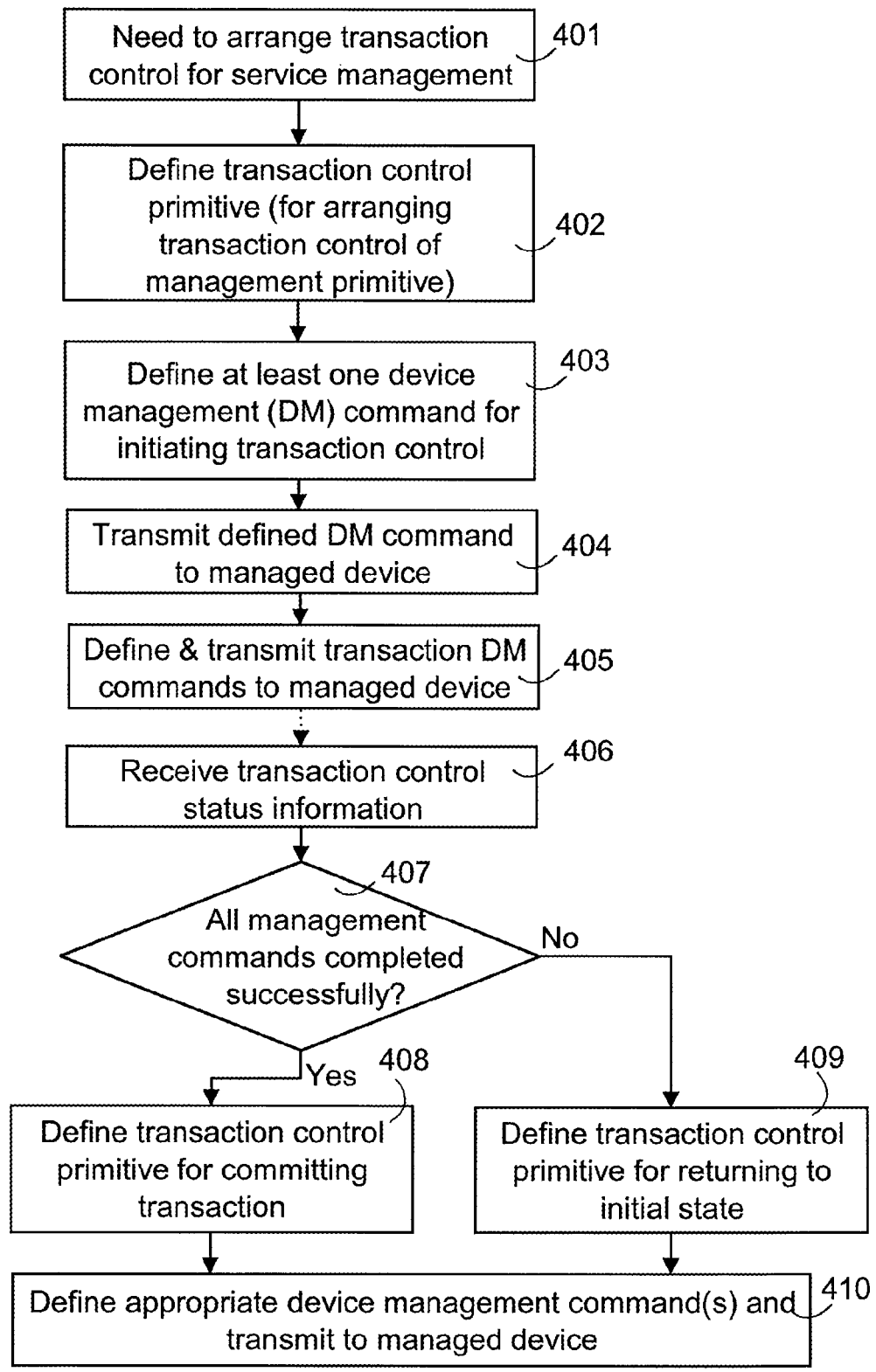
FIGS. 4*a* and 4*b* illustrate a method according to an embodiment of the disclosed embodiments.

FIG. 4a illustrates a method for arranging transaction control in a managing device, which in one embodiment is the data processing device 200. As there is need to arrange transaction control 401, at least one transaction control primitive is defined in step 402. This at least one transaction control primitive is for arranging transaction control of a service management primitive, for instance delivery of a service management level (between SM manager 210 and SM agent 110) deployment component. In step 403 at least one device management (DM) command for initiating transaction control is defined. In one embodiment the device carrying out the present method comprises mapping instructions on the basis of which the appropriate device management command(s) for implementing the transaction control primitive are defined. In step 404 the defined at least one device management command is transmitted to the managed device (100).

Although not shown in FIG. 4a, step 401 may be entered as a response to a need to have a device management related transaction to a managed device, in the present embodiment service management transaction to the managed device 100. Thus, in addition to transaction control primitive, also an appropriate transaction initiation command may be defined (which may involve mapping of a service management command to a device management command) and transmitted to the managed device 100. The device management command causing the initiation of the transaction control in the managed device may be transmitted as a part of a device management package comprising other device management commands or in a specific device management package, in some cases after other device management commands relating to the transaction in question already have been sent. For instance, these transaction control related device management commands may be sent in the same package with some or all device management commands specifying the desired service management primitive for the managed device. FIG. 4a further illustrates the controlled transaction by step 405 in which DM commands related to the controlled transaction are defined and transmitted to the managed device. In one embodiment these DM commands are specified on the basis of a service management command and mapping instructions 250. The further features of the transaction control (steps 406-410) are described later in combination with FIGS. 5b and 5c.

Figure 4B:
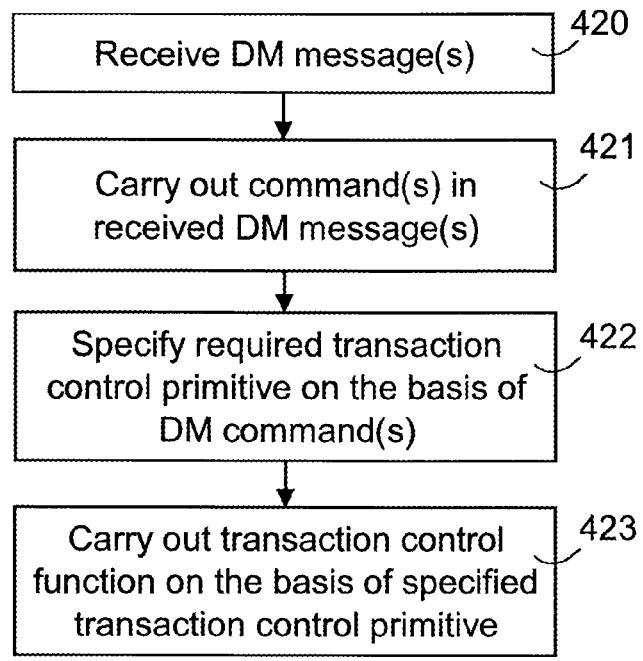

Reference is now made to FIG. 4b in which the basic functions for handling transaction control related functions in the managed device (100) are illustrated. In step 420 one or more device management messages comprising device management command(s) for transaction control are received. The commands in the received device management message(s) are carried out in step 421. This step may be carried out by the device management agent 120. Some alternative embodiments for device management messages causing a transaction control related feature are illustrated below, but generally they require the modification of one or more specific transaction control nodes in the management tree (140). At least one required transaction control primitive is specified on the basis of the received device management command(s) in step 422, for instance a transaction control primitive is identified on the basis of an execution of a DM level command. A transaction control specific function is then performed 423 on the basis of the specified transaction control primitive. Thus transaction control may be performed 423 on the basis of commands from the managing device 200, i.e. the transaction control primitives by the SM server 210 or by a specific transaction control manager, wherein the transaction control primitives may be represented by the device management commands. This means that as an execution of a device management command, for instance an execution command to a specific transaction control node in the management tree is detected, a corresponding transaction control primitive is identified (step 422) and an appropriate transaction control function is initiated. In other words, the service management level transaction control primitive may be called by execution of one or more device management commands. This may be done in a similar way as calling of SM primitives by DM commands. In one embodiment the SM agent 110 performs step 422 and initiates the transaction control function by contacting the transaction agent 150 performing the step 423. Thus SM agent 110 may be configured to follow one or more transaction control specific nodes and detect an execution command to such node, thereby identifying the required transaction control primitive.

In another embodiment the transaction agent 150 is configured to carry out also step 422. For instance, the transaction agent 150 may be configured to follow one or more specific transaction control nodes and detect an execution command by the DM agent 120 to such node.

In an alternative embodiment the DM agent 120 may specify the transaction control primitive (step 422) or at least detect a need for a transaction control primitive, and inform this to the SM agent 110 and/or directly the TR agent 150. In a further alternative embodiment the DM agent 120 merely delivers the received DM command to the SM agent 110 or the TR agent 150. These different embodiments may be applied for arranging the transaction control features illustrated below.

Figure 5A:
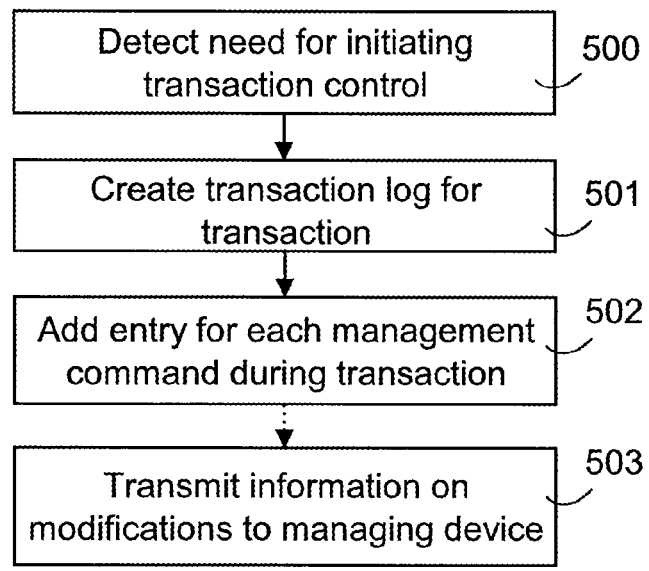
FIGS. 5*a*, 5*b*, and 5*c* illustrate a method according to an embodiment of the disclosed embodiments.
Figure 5B:
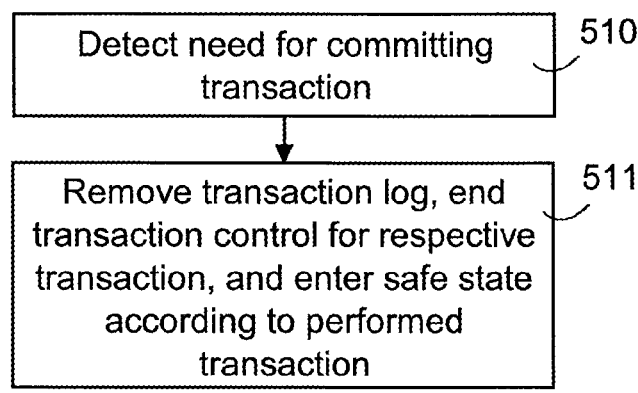
Figure 5C:
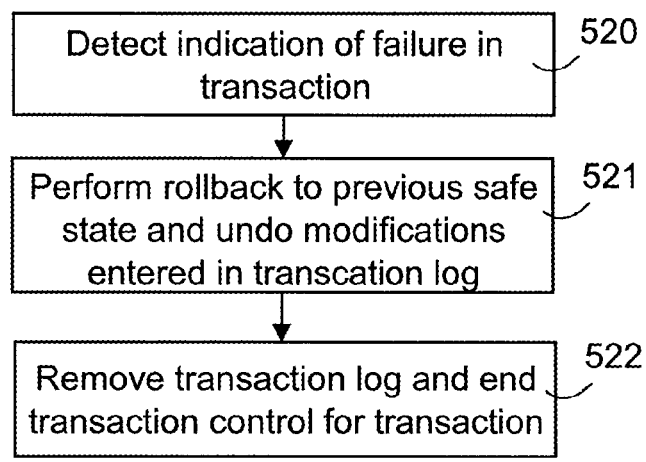

The following FIGS. 5a-5c illustrate more detailed description of some transaction control specific features capable of being carried out in step 423 of FIG. 4b. FIG. 5a illustrates the initiation of transaction control. In step 500 a need for initiating transaction control is detected. As already illustrated, the managed device 100 comprises the transaction agent 150 arranging the transaction control features in the managed device. The transaction agent 150 may be configured to carry out the features illustrated in FIG. 5a (and also 5b and 5c) on the basis of a service management primitive call or another kind of initiation of a transaction control function by the SM agent 110 or the DM agent 120. As mentioned above, the primitive may be called in response of an execution of one or more device management commands in steps 421 and 422. Thus, the need for upper layer service management primitive "start transaction" may be detected in step 500 by the transaction agent 150. In step 501 the transaction agent 150 may create a transaction log for the present transaction. This log may be used to keep track of device management commands of the controlled transaction (these device management commands being specified for carrying out one or more service management level commands. In one embodiment the modifications to a managed asset such as a deployment component caused by the received management commands are stored in the log. In case of an error, rollback to an initial state may then be performed on the basis of the transaction log. This transaction log may be stored in the memory 130 of the managed device 100.

Each transaction should be identified in the log by a unique identifier, which then enables the transaction agent to serve a number of transactions simultaneously. This transaction identifier may be used as an index on the basis of which the ongoing transactions can be tracked down. This identifier may be included in each primitive call between the managing device 200 and the managed device 100. In one embodiment the transaction identifier is or is derived from an existing identifier already used in the management messages between the managed device 100 and the managing device 200. For instance, a device management session identifier or a server identifier may be used for this purpose.

During the transaction the transaction agent 150 adds 502 an entry for each management command and/or modification caused by a management command. Thus, step 502 is repeated as long as all management commands have been carried out for the controlled transaction. In a typical scenario, a service management layer primitive is carried out, whereby the service management primitive requires the execution of multiple device management commands. Thus, an entry for each device management command may be added in the log in step 502.

The managed device also transmits 503 information on the outcome of the modifications, at least information on whether a device and/or service management command or primitive was completed successfully or not, to the managing device. The transaction agent 150 or some other entity, such as the DM agent 120 or the SM agent 110, in the managed device 100, may transmit this information. This information may already be sent when the managed device, for instance the device management agent 120, responses to the received management command, wherein the response includes an information element identifying whether the command was carried out successfully or not. The step 503 may be carried out after an entry has been made to the transaction log, or independently of the transaction log. The transaction control information sent in step 503 may be in one embodiment obtained from the transaction log.

FIG. 5b illustrates the termination of the transaction control in the case of the successful transaction. In step 510 a need for committing transaction is detected. Referring again to FIG. 4a, this command may be originating from the managing device 200 after steps 408 and 410: On the basis of the received transaction control information from the managed device 100 (step 406) and/or other transaction related status information the managing device may in step 407 determine whether all management commands were completed successfully. If so, transaction is complete and may be closed, whereby step 408 is entered and a transaction control primitive for committing the transaction is defined. In the similar way as already illustrated in steps 403 and 404, in step 410 one or more appropriate device management commands for the transaction control primitive are defined and transmitted to the managed device.

Referring again to FIG. 5b, a need for committing the transaction is detected 510 based on the device management command(s). A transaction control primitive for committing (SM level) transaction may thus be specified on the basis of the received device management command(s). This primitive may be called by the SM agent 110 or DM agent 120. The managed device 100, and more specifically the transaction agent 150 may then remove 511 the transaction log of this transaction and terminate the transaction control for the transaction. This primitive may also cause the managed device 100 to enter an initial (safe) state according to the performed transaction.

FIG. 5c illustrates the ending of the transaction control in the case of an unsuccessful transaction. Referring also to FIG. 4a and steps 406, 407, 409 and 410, in the case of an unsuccessful transaction i.e. one or more unsuccessful service and/or device management commands, one or more device management commands from the managing device 200 for returning to previous safe state are received in step 520. For instance, a command for specific rollback primitive is received and executed by the DM agent 120. In step 521a rollback to the previous safe service management state is performed. This means that the modifications done on the basis of the received management commands during the transaction are undone, whereby the previous settings, for instance, are reinstated in the management tree 140. In one embodiment the rollback is performed by using the information in the transaction log, i.e. modifications entered in the transaction log are removed. The transaction agent 150 also removes 522 the transaction log and ends transaction control for this transaction. On the basis of steps illustrated in FIG. 5c, the managed device 100 is then returned to the previous state before any service management actions of the unsuccessful transaction, whereby the device 100 may be used as before the unsuccessful service management.

Although not illustrated in FIG. 4a or FIG. 5c, the transaction and the transaction control may be again initiated in order to try again the execution of the desired management primitive. It is also to be noted that the transaction control primitives illustrated in FIG. 4a are only exemplary and the general procedure already illustrated may be applied also for other types of transaction control primitives.

According to an embodiment, referring to FIG. 4a, the managing device is configured to perform further analysis on the error in the transaction and/or initiate an alternative or a secondary transaction. For instance, before step 409 there may be at least one additional step leading to step 408, 409, and/or to step 401. The SM manager and/or the transaction control manager may carry out these functions. The further analysis may mean checking the relevance of the unsuccessful device management command. Some device management commands and/or some managed information be specified as less relevant, in which case the managing device 200 may decide to enter original step 408 of FIG. 4a even if some management command (for less relevant information) was unsuccessful. For instance, the managed device may comprise some obsolete information on the basis of which a management command failed. After noticing this source of the error, the obsolete information may be removed and transaction or only the failed command to the managed device may again be attempted. Alternatively, step 409 may be entered on the basis of the further analysis.

In the latter embodiment the managing device 200 may have predetermined secondary management path or strategy in the case the original management path or strategy of the management task fails. This management path or strategy may thus be selected when errors have been identified in the original transaction. For instance, there may be multiple combinations of device management commands, by the execution of which a service management level command or task can be carried out to the managed device 100, i.e. an end state may be reached. There are many possible schemes on how these secondary management paths or strategies may be determined and applied. The managing device 200 may comprise an algorithm for specifying or selecting secondary management commands forming at least part of the secondary management path or strategy. For instance, an order of the management commands may be different in the secondary management path as compared to the original management path.

A secondary combination may be selected, for instance on the basis of the mapping instructions 250, and a new transaction and transaction control may be initiated. Alternatively, such secondary management path or strategy may be determined after step 407. It is to be noted that in order to have only one active transaction for a management task, a rollback may be performed for the original transaction, and only after rollback the new secondary transaction management path or strategy is attempted. The embodiment applying secondary management path is especially advantageous since the managing device is in control of the transaction and may order an alternative scheme for configuring the managed device in case of an error in the original transaction.

In one embodiment there are checkpoints in a transaction between the starting point and the end point of the transaction. Once a checkpoint in transaction control has been attained, for instance a certain intermediate management command has been successfully carried out; an unsuccessful management command consequent to the checkpoint causes the transaction to return to the check point. This means that a management command subsequent to the checkpoint is again executed. In one embodiment the managing device 200, the SM manager or the transaction control manager, is arranged to implement features related to checkpoints. For instance, on the basis of received responses for device management commands the managing device may follow if a checkpoint has been attained. The checkpoints may be identified by specific checkpoint identifiers on the basis of which the managing device may follow and control the transaction.

Referring also the above embodiment on alternative management paths, it is possible that the managing device 200 is configured to replace at least some of the (initial) management commands for carrying out the desired management task. Thus, at least the failed command, possibly also one or more commands after or even before the failed command, is replaced by a new management command (delivered to the managed device 100) instead of performing complete rollback by steps 408 and 409. These newly specified management commands may be considered as a sub-path to the end state. For instance, this sub-path may be formed as beginning from a successfully achieved checkpoint, whereby a partial rollback may be performed. Therefore, the managing device 200 may be arranged to change the combination of required management commands (for performing certain management task which could related to service management level deployment component, for instance) in the middle of the transaction. This embodiment is advantageous in that the successful management operations need not to be rolled back.

In one embodiment the available transaction control primitives comprise start transaction, commit transaction and rollback transaction primitives which are utilized for overall transaction control. These primitives may be called by the SM agent 110 or the DM agent 120, and carried out by the transaction agent 150. Before leaving an initial safe-state in the managed device 100, the managing device 200 may open a transaction in the device (start transaction) and then call all the needed manipulating primitives in a sequence. If all the primitives were accomplished successfully, the managed device 100 will end up to the new safe-state by commit transaction-primitive. In case of failure the managing device 200 can order the managed device 100 to return to the initial safe-state by calling the rollback-primitive.

Figure 6:
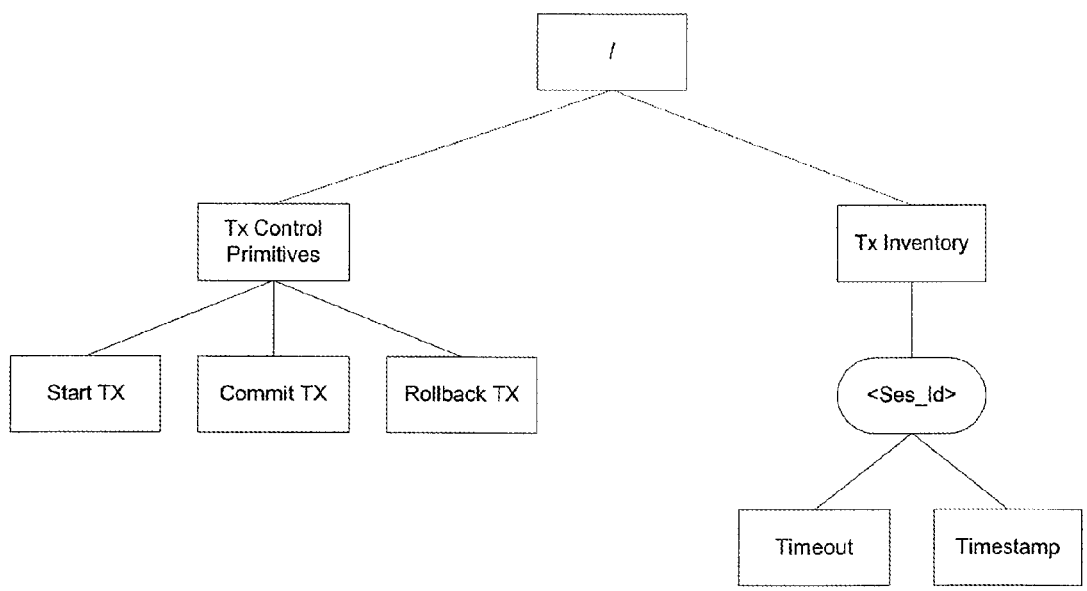
FIG. 6 illustrates a management tree according to an embodiment of the disclosed embodiments.

In one embodiment dynamic nodes illustrating transactions and/or static elements revealing transaction control primitives are modeled into the management tree 140, one example of such management tree being illustrated in FIG. 6.

The transaction control primitives may be indicated by conventional OMA DM commands to the transaction control nodes. These nodes may thus be manipulated by already existing OMA DM commands, for instance "add", "remove", and "exec". The management tree should be arranged such that at least the three already discussed transaction control operations (i.e. start, commit, and rollback) may be addressed to a transaction in question.

In one embodiment a dynamic node is introduced for each of the above-mentioned transactions. For instance, OMA DM "add"/"delete"/"exec" commands may be addressed to these nodes with the following semantics: "start transaction"="add", "commit transaction"="delete" and "rollback transaction"="exec". In this case the processing of "exec" command might implicitly introduce garbage-collection-like-reactivity in this specific node, which means that the node will be removed after undo-operations.

In another embodiment at least part of the transaction control primitives (for instance all of the three above mentioned ones) are represented as separate static nodes in the management tree. OMA DM "exec" commands may be addressed for them, whereby the transaction control feature represented in the addressed node is initiated (see steps 421 and 422 of FIG. 4b). In this embodiment there is no possibility for several parallel transactions per management session (because of no explicit transaction identifier) and there is no possibility to monitor ongoing transactions remotely (i.e. transaction-inventory) because of lack of inventory. FIG. 6 illustrates a management tree configuration according to an embodiment of the disclosed embodiments, wherein service management primitives have been bound to OMA DM by introducing static nodes for transaction control commands. In other words, transaction control primitives will be mapped in step 403 to "exec" commands addressed to these nodes.

In one embodiment the transaction agent 150 (the functions of which may be implemented by another entity such as the DM agent 120 or the SM agent 110) maintains information on ongoing transactions in the management tree 140. The transaction log may thereby at least partly be maintained as a part of the management tree 140. Thus the managing device (200) may remotely monitor transactions by making requests into the transaction inventory established for this purpose in the management tree 140. This remote monitoring may be used instead of or in addition to the steps 405 and 503 illustrated in FIGS. 4a and 5a.

In OMA DM level this embodiment can be implemented as a tree-structure having a dynamic node (or a sub-tree) for each ongoing transaction. For instance, the management tree 140 may include leafs having transaction identifiers only as an index. The transaction inventory shown in FIG. 6 is indexed with session identifiers. Thus, there is no need to carry explicit transaction identifiers in primitives or commands comprising associated with the transaction. On the other hand, there cannot be several transactions open (per management session) either.

If transaction control primitives are bound to OMA DM by using static nodes for transaction control primitives, this kind of inventory-tree has to evolve accordingly when OMA DM "exec" commands are addressed to the nodes. In a similar way, the inventory has to be refreshed if specific transaction control primitives are called in the OMA DM protocol. The modeling of the transaction-inventory in the management tree 140 also facilitates indexing: Each index type that may be used in inventory requests can be modeled as a separate dynamic node (index) having a fixed node (type) on top of that. Inventory requests may then be implemented by traversal algorithms across the inventory and by filtering the not desired findings. In addition to indexes, information included in the transaction log depends on transaction monitoring needs. This information is included in appropriate primitive calls as parameters.

In an alternative embodiment specific device management commands are introduced for initiating transaction control, for committing transaction control, and for performing rollback. The mapping instructions as already illustrated may then facilitate the managing device 200 to select the appropriate device management command(s) for the upper layer (service management) transaction control primitive (step 402 in FIG. 4a). In this embodiment the transaction control primitives may be delivered as such across OMA DM-layer to the transaction agent 150.

To increase fault-tolerance of the system, in one embodiment a time-out-value is associated with the transaction. If duration of the transaction exceeds the specified time-out-value, the transaction agent 150 will rollback the whole transaction and will return an error-code indicating this as a reply for the latest primitive call. FIG. 6 illustrates one possible way of arranging this embodiment, whereby the session specific data stored in the inventory includes a timestamp and a timeout-value that may be relevant in transaction monitoring.

As already mentioned, it is possible to utilize at least some of the features of the OMA DM specifications in the present system; for a more detailed description of the OMA device management protocol and other commands, for instance, reference is made to the OMA specification "SyncML Device Management Protocol", version 1.1.2, 12 Jun. 2003, 41 pages, and the OMA specification "SyncML Representation Protocol Device Management Usage", version 1.1.2, 12 Jun. 2003, 39 pages. In chapter 6.5, the latter specification defines the different protocol operation elements with which the DM manager 220 and/or the SM agent 110 may define the DM commands to the management tree 140 of the managed client device 100. The OMA DM specification "SyncML Device Management Tree and Description", version 1.1.2, chapters 5 to 8 describe the current management tree related features. In one scenario, conventional OMA DM procedures are applied between the DM manager 220 and the DM agent 120 for configuration management, i.e. for setting appropriate configuration parameters and the present SM procedures are applied for management of services, typically for management of entire applications or at least application portions, covering for instance installation and updates instead of merely setting appropriate settings. Besides the above-illustrated device management features, OMA DM security and session management features may also be utilized in the system.

The above-illustrated transaction control related features may be applied for service management (SM) and/or device management (DM). In the following, further service management features according to an embodiment are further illustrated, referring also to FIG. 2.

In an embodiment, the service management system employs deployment components for controlling some of manageable items controlling a service in the client device 100. A deployment component is an abstraction model dedicated especially for SM level management functions, and it represents a group of manageable items of an application. This embodiment provides flexibility for service management operations, and closely-related manageable items may be gathered as a single deployment component. In one embodiment, at least one node is stored in the management tree 140 for a deployment component. These deployment component nodes may be modified using SM commands which may be defined (by the SM agent 110 or the DM agent 120) on the basis of received DM level commands. The deployment components may be associated in the management tree 140 with states describing the current statuses of the deployment components. Further, the service management system may provide means for making an inventory of the existing deployment components. At least some of the above-illustrated transaction control related features may be used for controlling transaction related to a deployment component.

In one embodiment the management tree 140 comprises a node "Local Operations" for arranging (local) operations for the management tree 140. A sub-node may be stored for each local operation in the management tree 140. In response to an execution command to a local operation sub-node, an associated local operation is carried out and, as a result, one or more other nodes in the management tree 140 are modified. For more details on a service management system and specifically on various features provided by the SM agent 110, DM agent 120, SM manager 210, and DM manager 220, in which system the present transaction control related features could be applied, reference is made to a co-pending application U.S. patent application having U.S. Ser. No. 10/966,747, filed on Oct. 15, 2004 and entitled "Device management system", incorporated herein as a reference in its entirety.

It should be noted that the embodiments described above could also be applied in any combination thereof. It is apparent to a person skilled in the art that while the technology advances, the basic idea of the disclosed embodiments can be implemented in many different ways. The disclosed embodiments and its embodiments are thus not restricted to the examples described above, but can vary within the scope of the claims.

What is claimed is:

1. An apparatus, comprising:
a memory;
a processor coupled to the memory operable to:
store in the memory one or more transaction control primitives, wherein the one or more transaction control primitives perform a controlled transaction of a management task in a managed device, the controlled transaction comprising one or more checkpoints between a starting point and an ending point of the controlled transaction;
map a transaction control primitive, for returning the managed device to a state preceding a transaction of the management task, to a device management command;
transmit the device management command to a managed device;
undo one or more executed device management commands associated with the controlled transaction by causing the controlled transaction to return to a preceding checkpoint; and
re-execute one or more device management commands subsequent to the preceding checkpoint.

2. The apparatus of claim 1, wherein the processor is further operable to:
determine whether an execution failure of at least one of the one or more transmitted device management commands occurred; and
based on the determination, transmit at least another device management command to the managed device to replace at least one of the one or more executed device management commands for performing the transaction of the management task.

3. The apparatus of claim 1, wherein each of the one or more device management commands comprise transaction control device management commands corresponding to one or more of the transaction control primitives.

4. The apparatus of claim 3, wherein the processor is further operable to map each of the one or more corresponding device management commands to the one or more transaction control primitives based on mapping instructions.

* * * * *